(12) United States Patent
Henning

(10) Patent No.: US 6,457,622 B2
(45) Date of Patent: Oct. 1, 2002

(54) ACTUATION MECHANISM FOR A TARPING SYSTEM

(75) Inventor: Steven A. Henning, Speedway, IN (US)

(73) Assignee: Aero Industries, Inc., Indianapolis, IN (US)

( * ) Notice: Subject to any disclaimer, the term of this patent is extended or adjusted under 35 U.S.C. 154(b) by 0 days.

(21) Appl. No.: 09/801,415

(22) Filed: Mar. 8, 2001

Related U.S. Application Data

(63) Continuation-in-part of application No. 09/532,606, filed on Mar. 22, 2000, now Pat. No. 6,318,790.

(51) Int. Cl.$^7$ .......................... B60J 11/00; B60J 11/14; B60J 11/18
(52) U.S. Cl. .......................... 226/98; 267/272; 267/285
(58) Field of Search ........................... 296/98; 267/272, 267/285, 199, 275, 155

(56) References Cited

U.S. PATENT DOCUMENTS

| | | | |
|---|---|---|---|
| 2,503,149 | A | 4/1950 | Bonnemort |
| 2,577,964 | A | 12/1951 | Heuer |
| 2,751,179 | A | 6/1956 | Oravec |
| 2,983,161 | A | 5/1961 | Watson |
| 4,516,802 | A | 5/1985 | Compton |
| 4,635,755 | A | 1/1987 | Arechaga |
| 5,129,698 | A | 7/1992 | Cohrs et al. |
| 5,174,625 | A | 12/1992 | Gothier et al. |
| 5,655,807 | A | 8/1997 | Rosario |
| 5,799,760 | A | 9/1998 | Small |
| 5,887,937 | A | 3/1999 | Searfoss |
| 5,944,374 | A | 8/1999 | Searfoss |
| 5,954,388 | A | 9/1999 | Liggett |

FOREIGN PATENT DOCUMENTS

JP 58203241 11/1983

OTHER PUBLICATIONS

PCT International Search Report Completed on Jul. 27, 2001.
Donovan Enterprises, "Truck Tarping Systems,".
Pioneer Cover–All, "Tarping Systems by Pioneer Cover–Up,".
Aero Industries, Inc., "Easy Cover Tarping System,".
Aero Industries, Inc., "Easy Cover VS. the Competition,".
Roll.Rite, "Do it RITE with Roll.Rite Electric Tarp Systems,".
Pioneer Cover–All, "Covering System Model 100M,".
Merlot, "Arm tarp, Model 695,".
Aero Industries, Inc., "Easy Cover Economy Dump Tarping System,".

*Primary Examiner*—D. Glenn Dayoan
*Assistant Examiner*—H Gutman
(74) *Attorney, Agent, or Firm*—Maginot, Moore & Bowman

(57) ABSTRACT

An open-topped vehicle body, such as a dump body, includes a tarping system that is deployed over the body by a pivoting bail member. An actuation mechanism applies a torque to the bail member to automatically pivot the member and deploy the tarp. The actuation mechanism includes a number of double coil spiral torsion springs anchored on a shaft attached to the dump body. The springs each includes a right hand and a left hand coil portion concentrically wound about an integral center anchor portion. The shaft includes an elongated slot to receive and support the center anchor portion of each spring within the mechanism. The coil portions of each spring include a left and right reaction end configured to contact and provide a torsional force against a corresponding reaction post within the housing. In one embodiment the housing is made in two connectable halves with one half of each reaction post integrally formed into each housing half. The actuation mechanism can be used as a knuckle joint connecting the bow extension member and the bow base member in a bow base and bow extension tarp cover system.

20 Claims, 6 Drawing Sheets

ACTUATION MECHANISM FOR A TARPING SYSTEM

RELATED APPLICATIONS

The present application is a continuation-in-part of U.S. application Ser. No. 09/532,606, now U.S. Pat. No. 6,318,790, filed on Mar. 22, 2000 in the name of inventor Steven A. Henning and assigned to the assignee of the present application.

BACKGROUND OF THE INVENTION

The present invention relates to covers or tarping systems for open-topped containers. The invention concerns an apparatus for pivotably mounting a flexible cover over the bed of a truck, such as a dump truck, and more specifically to an actuation mechanism for pivoting the cover over the truck bed.

Some hauling vehicles, such as dump trucks, include open-topped containers used for hauling or storing various materials. For example, in a typical dump truck application, the dump body is used to haul a variety of particulate material, such as gravel, aggregate or similar products. In addition, some hauling vehicles carry organic materials, such as grain or produce.

Depending upon the nature of the materials stored in the open-topped container, it is often desirable to provide a cover for the container. Of course, rigid covers are well known that may be hinged from one end of the container body. These rigid covers have gradually given way in the industry to flexible tarping systems because the flexible tarpaulin can be easily stowed when a cover is not necessary, such as when the dump bed is being loaded. Moreover, the flexible tarp is much easier to deploy than a rigid cover.

A variety of tarping systems have been developed that are geared to particular hauling vehicle applications. One such tarping system for use with dump trucks is the EASY PULL® Tarping System of Aero Industries, Inc. The EASY PULL® System includes a flexible tarp that is wound around a spool at one end of the dump bed. A rope attached to the free end of the tarp can be used to unwind the tarp from the roller to span the length of the dump bed.

Another cover system particularly suited for open-topped containers on hauling vehicles, is the EASY COVER® Tarping System, also of Aero Industries, Inc. The EASY COVER® Tarping System includes a U-shaped bail that is pivotably mounted at its ends to the base of the container body. The horizontal section of the U-shaped bail is attached to the tarp, while the free ends of the vertical elements are pivotably mounted. In one application, the EASY COVER® Tarping System allows the tarp to be manually pulled in a sweeping arc over the container load.

In another application of the EASY COVER® System, an actuation mechanism is provided that automatically pivots the U-shaped bail member to deploy the tarp over the load within the open-topped container. When the actuation mechanism is released, it automatically pivots the bar, thereby unfurling the tarp from the tarp roller at the front of the vehicle. A hand crank or powered motor can be provided to rotate the tarp roller to wind the tarp when it is desired to open the container top. The hand crank or motor mechanism must be capable of providing sufficient mechanical advantage to overcome the deployment force of the actuation mechanism.

A vehicle 10 is depicted in FIG. 1 having an open-topped body 13. As illustrated in FIG. 1, the vehicle can be a dump truck, with the open-topped container comprising a dump body. A tarpaulin cover 16 is shown in its deployed configuration spanning the length of the container and covering the load within. The tarp cover 16 can be wound onto a tarp roller 19. Both the tarp cover 16 and the roller 19 can be of a variety of known constructions, such as the EASY COVER® Tarping System.

A bail member 22 is connected to one end of the tarp cover 16 in the manner described above. The bail member is pivotably mounted to the truck body 13 by way of an actuation mechanism 25. This actuation mechanism can take a variety of forms in the prior art. For instance, one such mechanism relies upon extension springs that apply a linear force at some point along the bail member 22, to cause the bail member to pivot when the tarp roller 19 is released. In a similar configuration, a compression spring is used to push the bail member outward, thereby pivoting it about its pivot mount at the base of the truck body 13.

In other applications, a coil torsion spring applies a torque or moment to the lower ends of the U-shaped bail member 22. One advantage of the coil torsion spring is that it can be mounted substantially under the truck body 13 so that the actuation mechanism is clear of the working area around the truck body. In some instances, an under-body mount cannot be accomplished. In these instances, a spiral torsion spring assembly can be used to apply torque at the pivot mount of the bail member 22.

Spiral torsion springs are also used in bow base/bow extension applications. Here, a bow base element coupled with a bow extension element act as a bail member. The bow base attached to the truck body is connected to a bow extension attached to the truck cover. One or more spiral torsion springs is used in the coupling between the bow base and bow extension members.

One such spiral torsion spring of the prior art is depicted in FIGS. 2 and 3. In particular, the actuation mechanism 25' is mounted to the vehicle bed by a mounting plate 27. The actuation mechanism 25' includes a post 29 that projects from the mounting plate 27. The post is configured to extend through openings at the pivot mount for the bail member 22'. A torsion spring pack 31 is disposed within the pivot end 23' of the bail member 22'.

As shown most clearly in FIG. 3, the spring pack 31 can include a number of individual springs, such as torsion spring 31a. Each spring includes an anchor end 33 that is configured to fit within an anchor groove 35 defined along the length of the post 29. The opposite end of the torsion spring constitutes a reaction end 37 that reacts against a post 39 extending through the interior of the bail member 22'.

With any of the various actuation mechanisms described above, the amount of force generated by the mechanism depends upon the nature of the tarp cover 16 and the length that it must reach in its deployed position. Obviously, the longer the open-topped body 13, the longer distances the tarp cover 16 must cover. This translates to longer arms for the bail member 22. The longer the arms, the stronger the force or torque needed to pivot the arms from the stowed to the deployed position.

In order to generate this increased force using a spiral torsion spring configuration, such as that shown in FIGS. 2 and 3, additional springs, such as spring 31a, must be added to the spring pack 31. In one typical prior art spiral spring system, between three and six such springs are utilized, depending upon the length of the bail member arms. In the configuration depicted in FIG. 2, four such springs are provided. Each of the springs is aligned axially along the length of the post 29. Obviously, additional springs added to the pack 31 would require a longer post 29.

It has been found in practice that any spring pack using more than three springs projects too far from the side of the vehicle body 13. This excessive projection presents two problems: (1) since the arms of the bail member 22 necessarily project farther from the side of the body 13, they are more easily struck or damaged; and (2) federal law prohibits tarping system hardware from exceeding three inches from the side of the truck body. Since each spiral torsion spring is typically about one inch in width, it can be easily be appreciated that no more than three such springs can fit within the federally mandated envelope.

Consequently, there remains a need for an actuation mechanism that can utilize spiral torsion springs for a wide range of bail member dimensions, while still avoid the problems of the prior art system shown in FIGS. 2 and 3.

SUMMARY OF THE INVENTION

In order to address this unresolved need, the present invention contemplates a spiral torsion spring configuration that incorporates two spring coils within the same envelope. In one feature of the invention, the spring is a double coil spring in which two concentrically wound coil portions are connected at a center anchor portion. An actuation mechanism according to a preferred embodiment of the invention includes a shaft defining an elongated slot that is configured to receive the center anchor portion of a number of such double coil springs.

The actuation mechanism can further include a housing that surrounds the double coil springs and mates with a pivot end of an arm of the bail member. Each coil portion of each spring terminates in a reaction end that is configured to engage a post passing through the housing. In the preferred embodiment, two such posts are situated within the housing at diametrically opposite positions. Each spring element, then, includes a left coil portion and a right coil portion, each having a corresponding reaction end that contacts a respective one of the diametrically opposite posts. Thus, each coil portion can exert a torsional force against each post, which results in a pivoting moment being applied to the arms of the bail member through the housing.

In one aspect of the actuation mechanism, the housing can include a male and a female half that are connected together about the double coil springs. The two halves can be combined to define a pair of peg holes at diametrically opposite sides of the housing. The set of peg holes mate with similar pairs of pegs projecting from the pivot end of the arms of the bail member when the housing halves are clamped about the pivot end. The pegs and peg holes hold the bail member arms to the housing.

Alternatively, the bail member arm can be of a tubular design wherein the arm attachment portion of the housing is inserted into the bail member arm. In this case, the bail member also has a pair of holes that mate with the peg holes in the housing. A pair of bolts or other suitable fasteners can be used to secure the arm to the housing.

Each housing half can also define a shaft bore through which the slotted shaft extends. Preferably, the shaft projects from a mounting plate that can be mounted to the open-topped container to support the actuation mechanism. A pair of bushings can be disposed between the shaft and the housing halves to reduce friction as the housing rotates about the shaft under the torsional force applied by the double coil springs. The free end of the shaft projects beyond the housing and can receive a retaining ring to hold the housing on the shaft.

Likewise, the reaction posts can extend through reaction bores defined in the male and female housing halves. In one embodiment, the reaction posts include an enlarged head at one end and receive a retaining ring at the other end to hold the reaction posts within the housing.

In an alternative embodiment, the male and female housing halves can have the reaction posts fixed to the interior of the housing halves. Preferably, each housing half can have half of each post cast into the housing half. The posts in this embodiment can include a web of material connecting the length of the posts to one side of the housing halves for added strength, giving the posts a keyhole type cross section. In this configuration, the male and female halves can be held together with screws or other suitable fasteners.

In one aspect of the invention, the double coil springs reduce by half the number of spiral torsion springs required to achieve a desired deployment torque. Thus, when six prior art torsion springs are called for, only three double coil springs of the present invention are required. Each double coil spring can be formed of wound flat stock, with the number of windings of each coil portion being determined by the desired torsional force. Preferably, the flat stock has a width of about one inch or less, so a combination of three double coil springs easily falls within the federally mandated prominence guidelines.

In another aspect of the invention, the actuation mechanism is adapted for use as a knuckle joint with a bow base and bow extension cover system. In embodiments of this aspect, the housing can mate with either the bow base or the extension member with the pivot shaft attached to the other. Here, the torsional force generated by the spring coils results in pivoting movement of the bow base and bow extension relative to each other.

It is one object of the present invention to provide an actuation mechanism for use in deploying a cover over an open-topped container. A more particular object is to provide such a mechanism for use with a flexible tarping system for a vehicle, such as a dump truck.

One advantage achieved by the present invention over prior art devices is that a requisite amount of deployment torque can be generated by a spring pack that fits within an acceptable envelope. A further benefit is that the number of parts that must be assembled to form the actuation mechanism is reduced.

Other benefits and objects of the present invention can be readily discerned upon consideration of the following written description and accompanying figures.

DESCRIPTION OF THE PREFERRED EMBODIMENTS

Figure 1:
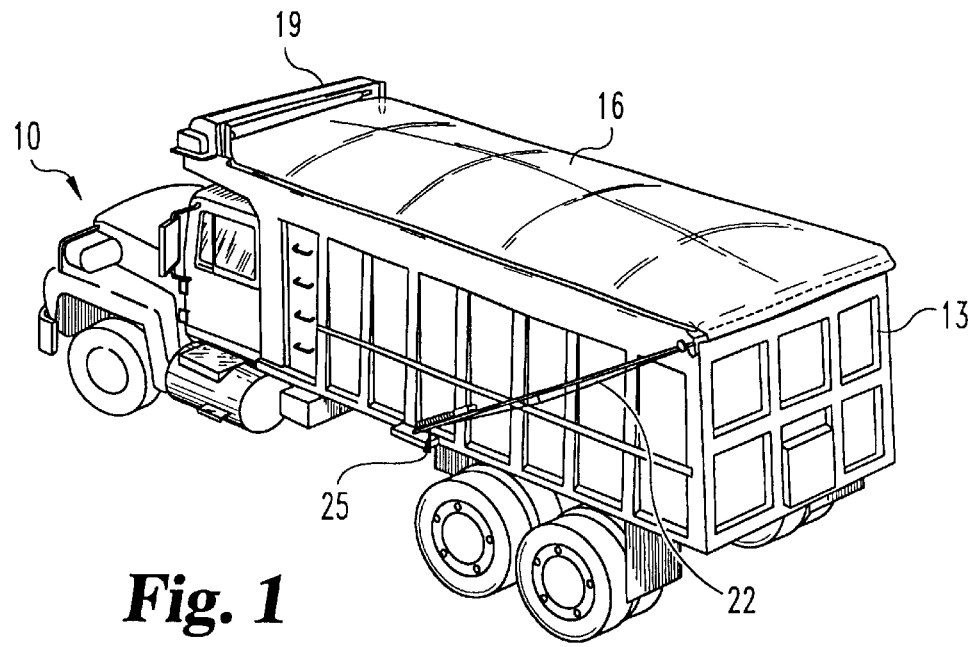
FIG. 1 is a perspective view of a vehicle utilizing a tarping system to cover the open-topped body of the vehicle.
Figure 2:
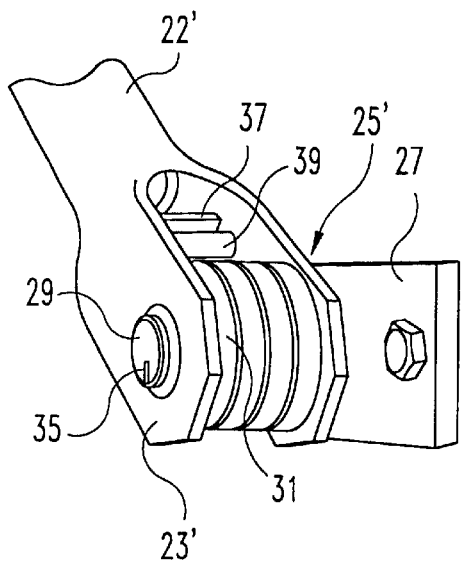
FIG. 2 is a side perspective view of an actuation mechanism of the prior art.
Figure 3:
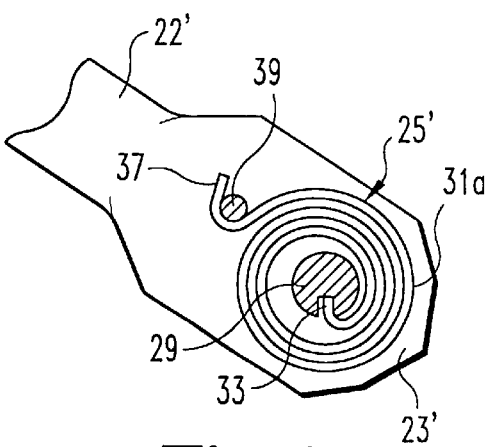
FIG. 3 is a partial cross-sectional view of the actuation mechanism shown in FIG. 2.

For the purposes of promoting an understanding of the principles of the invention, reference will now be made to the embodiments illustrated in the drawings and specific language will be used to describe the same. It will nevertheless be understood that no limitation of the scope of the invention is thereby intended. The invention includes any alterations and further modifications in the illustrated devices, described methods, and further applications of the principles of the invention, which would normally occur to one skilled in the art to which the invention relates.

In accordance with certain aspects of the present invention, an actuation mechanism 25" is provided for use with the pivoting bail member 22 shown with the vehicle 10 in FIG. 1. The actuation mechanism utilizes a number of spiral torsion springs to apply a torque moment at the pivot end of each arm of the bail member 22. In one aspect of the invention, each spiral torsion spring includes double concentric coil portions connected by a center anchor section that is held fixed relative to the pivoting bail member arms. The novel spiral spring incorporates two reaction ends that each provide a restoring or deployment torsional force to the bail member arms.

Figure 4:
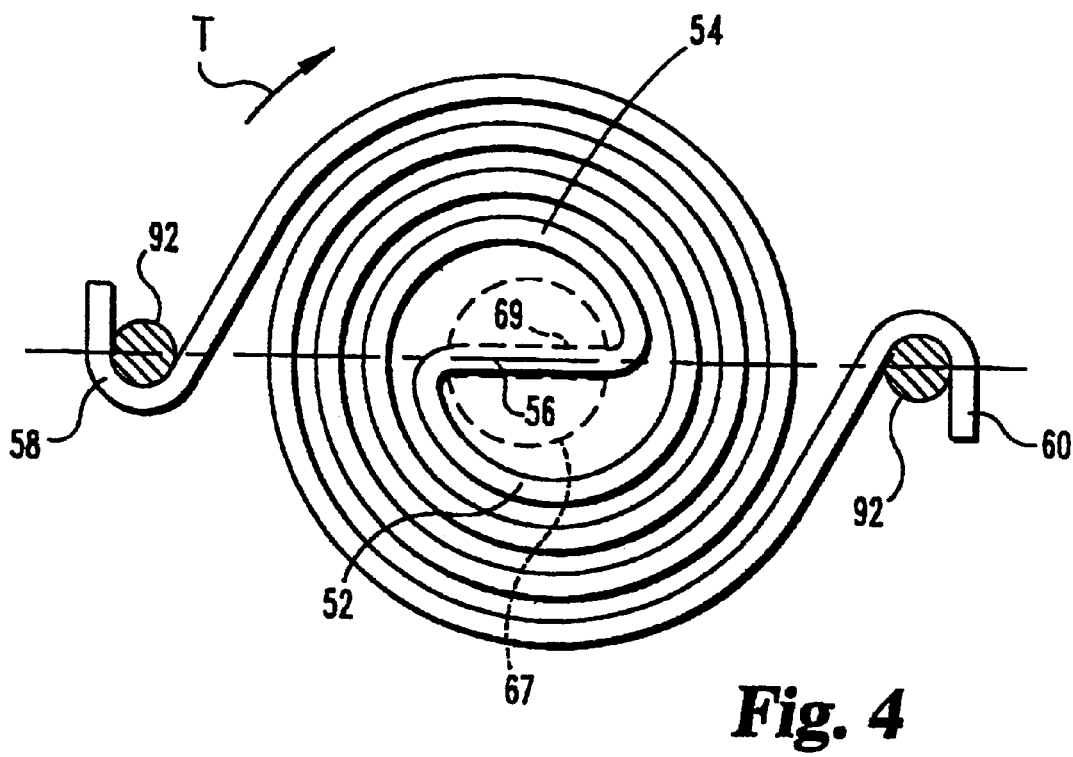
FIG. 4 is a top elevational view of a spiral torsion spring in accordance with one embodiment of the present invention.

More specifically, one preferred embodiment of the invention utilizes a double concentric coil spiral spring 50 shown in FIG. 4. The spring 50 includes a left coil portion 52 and a right coil portion 54. The two portions 52 and 54 are connected at the center of the spiral by a center anchor portion 56 and are concentrically wound about this anchor portion. The two coil portions are disposed in a common plane passing through the anchor portion, so the entire spiral spring 50 presents the same envelope as a prior art spiral spring. The concentric winding of the two portions 52, 54 means that segments of the left and right portions alternate along a radial line emanating from the center anchor portion.

The free end of each coil portion 52 and 54 includes a corresponding reaction end 58, 60 that reacts against or provides a torsion force against an element connected to the arms of the bail member 22. Preferably, the two reaction ends 58, 60 are diametrically opposite, and in a most preferred embodiment are aligned with the center anchor portion 56, as depicted in FIG. 4.

Each of the coil portions 52, 54 are wound in the same direction, such as counter-clockwise in the illustrated embodiment. Of course, the coil portions can be wound in a clockwise sense; however, it is important that the portions be wound in the same direction so that they can provide a torsion force in the same direction, as represented by the arc arrow T. It is understood that when the spring 50 is installed within an actuation mechanism 25", the spring is wound in a direction opposite the direction of the arrow T as the tarp cover is moved to its stowed position around the tarp roller 19. In this instance, the diameter of the two coil portions 52, 54 are reduced as the spring 50 is tightly wound. Of course, moving the bail arms to their stowed position tightens the coil portion of the spring 50, thereby storing potential energy for future deployment.

Figure 5:
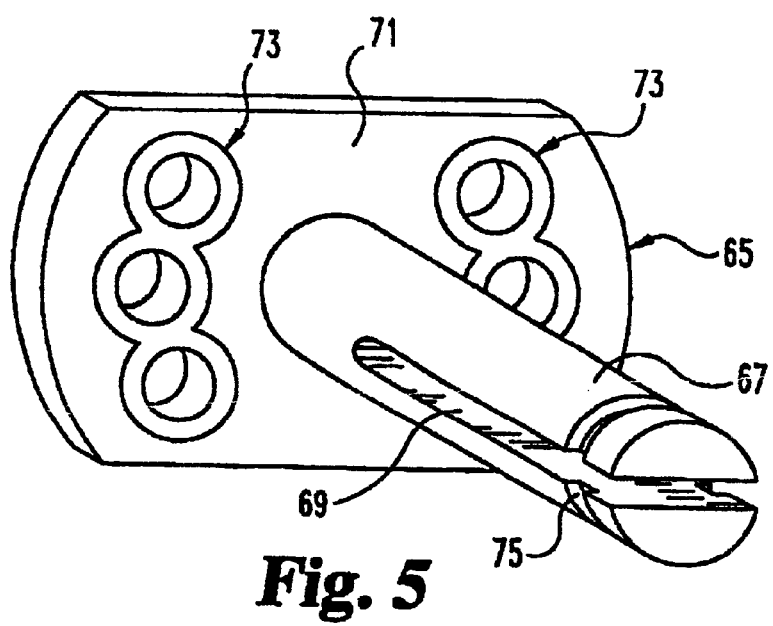
FIG. 5 is a top perspective view of a shaft bracket for use with the spiral torsion spring shown in FIG. 4 to constitute an actuation mechanism in one embodiment of the invention.

Another element of the actuation mechanism is the shaft bracket 65, depicted in FIG. 5. The shaft bracket includes a mounting plate 71 configured to be mounted to the side of the truck body 13. A shaft 67 projects perpendicularly outward from the mounting plate 71. The shaft 67 defines an anchor slot 69 that extends along a substantial portion of the length of the shaft. This anchor slot 69 has a width sufficient to accommodate the center anchor portion 56 of each of the double coil spiral springs 50 included with the actuation mechanism. This arrangement of the center portion 56 relative to the shaft 67 is depicted in dash lines in FIG. 4.

Figure 6:
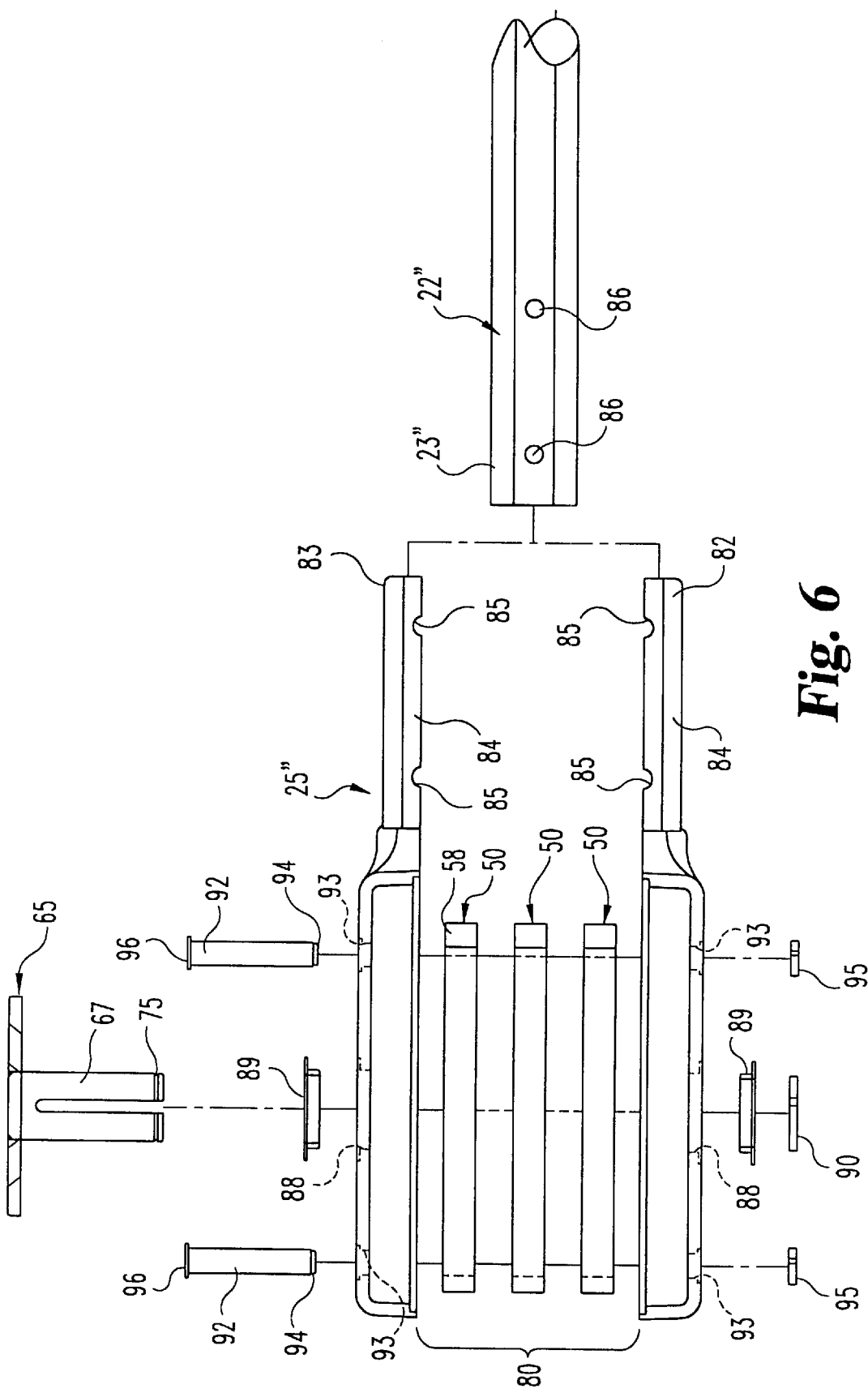
FIG. 6 is a top exploded view of an actuation mechanism according to one embodiment of the present invention utilizing the spiral torsion spring of FIG. 4 and the shaft bracket of FIG. 5.

In accordance with the preferred embodiment, the double coil spiral spring 50 and shaft bracket 65 form part of an actuation mechanism 25" as shown in FIG. 6. In order to integrate the springs with the bail member, the actuation mechanism 25" includes a housing 80 formed by a male housing half 82 and a female housing half 83 that can be connected together about a number of spiral springs 50. The two housing halves can be at least initially snap-fit together, and ultimately held together by some type of fastener, such as a bolt and nut.

The two housing halves 82 and 83 combine to define an arm engaging portion 84. The arm engaging portion 84 is elongated and hollow to receive the pivot end 23" of an arm of the bail member 22". The two halves 82, 83 also combine at the arm engagement portion 84 to define a pair of peg holes 85 on opposite sides of the portion. These peg holes are configured to clamp about a pair of pegs 86 projecting from opposite sides of the pivot end 23" of the bail member 22". Thus, when the two housing halves 82, 83 are combined about the pivot end 23" of the bail member 22", the pegs 86 are solidly retained within the peg holes 85, to prevent translation and rotation of the bail member 22" relative to the arm engagement portion 84.

Each of the housing halves 82, 83 defines a shaft bore 88 projecting therethrough. This shaft bore 88 is configured to pivotally receive the shaft 67 of the shaft bracket 65. Preferably, a pair of shaft bushings 89 are provided at each of the housing halves 82, 83. These bushings can reduce the amount of friction between the shaft 67 and the housing 80 of the actuation mechanism as the housing, (together with the bail member 22") pivots relative to the shaft 67.

It is understood that the shaft bore 88 is arranged so that the anchor slot 69 of the shaft 67 can engage the center anchor portions 56 of each spiral spring 50 contained within the housing 80. In the illustrated embodiment, three such springs are provided, although one or two springs may be contained within the housing depending upon the amount of pivoting torque required for the particular bail member 22" and tarp system.

The reaction ends 58 and 60 of each of the coil portions 52 and 54 react against corresponding posts 92. Each post 92 passes through combined post bores 93 defined in each of the housing halves 82, 83. Preferably, the reaction ends 58, 60 are configured to bend around a corresponding post, in the manner depicted in FIG. 4. Since the reaction post 92 does not pivot, no bushing is required between the post and the housing halves.

In order to retain the combined housing 80 on the shaft 67, the shaft defines a retaining ring groove 75 at its free end. This groove 75 projects just outside the male housing half 82, as shown in FIG. 6. A retaining ring 90 is provided that can be engaged within the groove 75. The retaining ring 90 can be in the form of a snap ring or other mechanism sufficient to hold the housing 80 on the shaft 67. For instance, instead of a retaining ring 90, a cotter pin arrangement can be implemented.

A similar arrangement is applied to each reaction post 92. Specifically, each post can include a groove 94 at its free end that can be engaged by a retaining ring 95. Preferably, the reaction post 92 can have an enlarged head 96 at the end opposite the retaining ring. This enlarged head 96 can fit within an undercut portion of the post bores 93 in the female housing half 83. It is understood, of course, that other means for mounting the reaction post 92 to the housing halves 82, 83 are contemplated. For instance, the free end of each of the reaction post 92 can be threaded to engage corresponding threads in the post bores 93 within the male housing half 82.

The present invention provides an actuation mechanism 25" that can be easily assembled. Specifically, each of the housing halves can be readily engaged about the pivot end 23" of the bail member 22". The springs 50 forming a spring pack can be contained within the housing 80 in their free state as the shaft 67 is passed through the shaft bores 88 and the anchor slot 69 engaged about the center anchor portion 56 of each of the springs 50. Attachment of the reaction posts 92 to the housing halves 82, 83 can require some torquing or winding of the spiral springs 50. It is preferable that the spring pack has some residual torque when the bail member 22" is in its deployed position.

The orientation of the shaft 67 relative to the bail member 22" can be adjusted by positioning the mounting bracket 71 on the vehicle body 13. To accomplish this adjustment, the mounting plate 71 defines an array of mounting holes 73. The array of mounting holes allows the shaft bracket 65 to be affixed to the truck body 13 with the anchor slot 69 at different angular orientation relative to the truck body. These different angular orientations impact the residual torque exerted on the bail member 22" when the tarp cover 16 is fully deployed. In addition, this angular orientation of the shaft 67 and anchor slot 69 also determines the amount of initial torque applied to the tarp cover when it is released from the tarp roller 19.

The actuation mechanism 25" can be assembled by first extending the reaction posts 92 through the post bores 93 in the female housing half 83. The requisite number of springs 50 can be placed within the housing half 83 with the reaction ends 58, 60 engaged about a corresponding one of the posts. The pivot end 23" of the bail member 22" can be situated within the shaft engaging portion 84 of the female housing, with the pegs 86 extending into the female housing portion of the peg holes 85.

At this point, the male housing halve 82 can be combined with the female housing half 83 to form the complete housing 80. Of course, the posts 92 extend through the male housing post bores 93 and the pegs 86 extend into the male housing peg holes. The housing assembly can be completed by bolting the two halves together. The retaining rings 95 can be engaged within the grooves 94 at the exposed end of each post 92.

The shaft bracket 65 can be fastened to the truck body 13 at a suitable pivot location for the bail member 22". The assembled housing can be mounted on the shaft 67 with the slot 69 sliding around the center anchor portion 56 of each spring in the spring pack. When the shaft extends beyond the male housing half 82, the retaining ring 90 can be engaged within the groove 75 of the shaft to hold the housing on the shaft.

In one specific embodiment of the invention, each of the double coil spiral springs 50 can be formed from flat steel wire having a thickness of 0.187 in. and a width of 0.625 in. A spring sized in this manner is capable of generating 900-in. lbs. of torque at 120° of deflection.

Preferably, the shaft 67 has a diameter of about 1.25 in. Thus, the working length of the center anchor portion 56 must be at least 1.25 in. to accommodate the shaft.

Preferably, the shaft 67 and the reaction post 92 are formed from steel bar stock. The male and female housing halves 82, 83 can be die cast in steel or other suitable material. The shaft bushings 89 can be formed of bronze or other similar low friction material. In a further embodiment of the invention, the reaction posts 92 can be integrally formed within one or both of the housing halves 82, 83. The reaction posts themselves can also provide a means for fastening the male and female halves together, such as by externally threading a free end of the posts for engagement by a machine nut, or internally threading the posts to receive a bolt.

Figure 7:
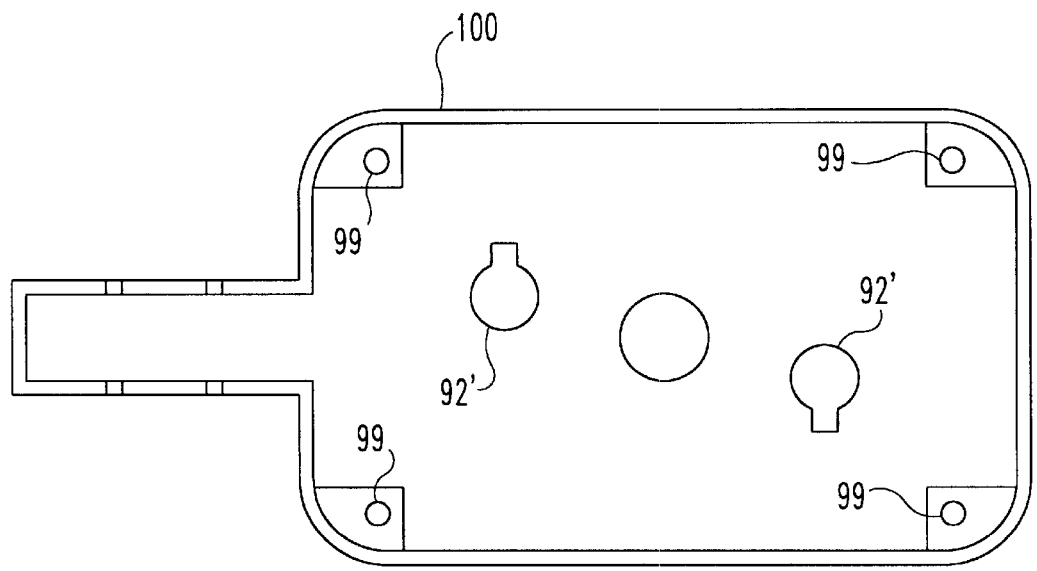
FIG. 7 is a top elevational view of an alternate embodiment of a housing half for the actuation mechanism having one half of each reaction post integrally formed in the housing.
Figure 8:
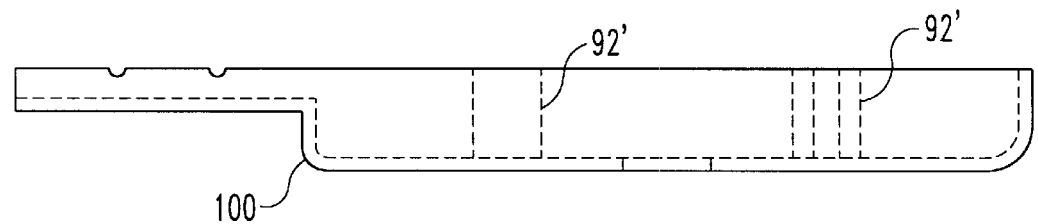
FIG. 8 is a side elevational view of the housing half of FIG. 7.
Figure 9:
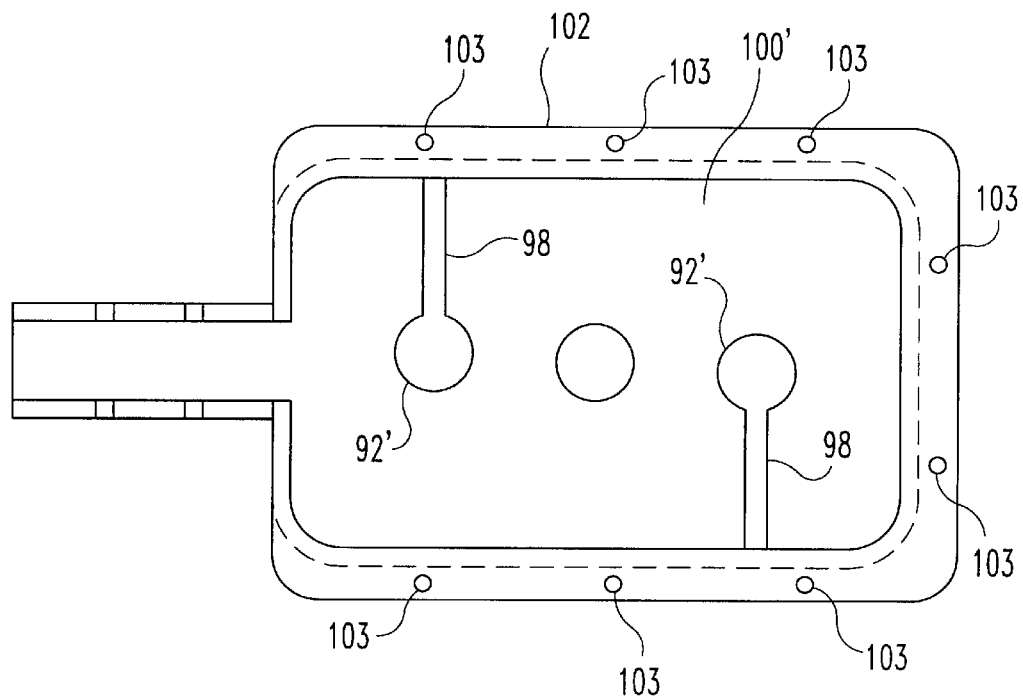
FIG. 9 is a top elevational view of another embodiment of a housing half having a flange for connecting two halves together.

In another embodiment, one half of each reaction post 92' is integrally formed in each housing half 100 and 100' as depicted in FIGS. 7–9. A web of material 98 as shown in FIG. 9 can be added connecting the post halves to the sidewall of the housing half for added strength. The combined post and web can have a keyhole-type cross-section. In this configuration, the housing halves can be held together by screws or bolts through the bolt bores 99. Alternatively, the housing halves can be formed with a flange 102 around the perimeter as shown in FIG. 9. The housing halves can then be connected with bolts through holes 103 in the flange 102 of each half. Preferably, the housing halves are cast in a metal such as aluminum.

The configuration of FIG. 7 allows the spring to flipped over so that torque can be applied in either a clockwise or counterclockwise direction of rotation. The spring can only be installed one way in the configuration of FIG. 9.

Figure 10:
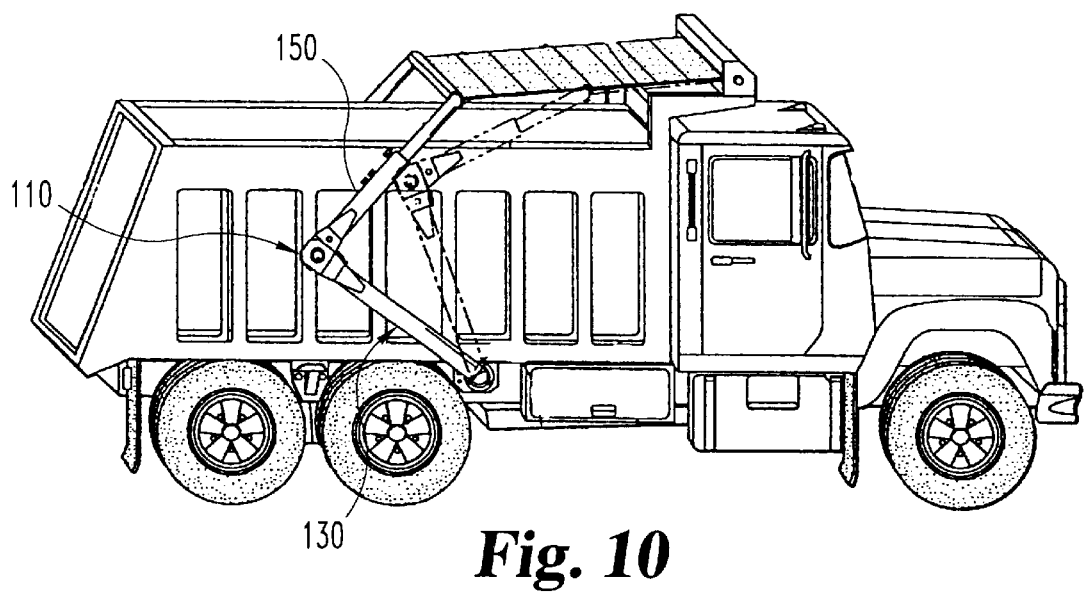
FIG. 10 is a perspective view of a vehicle using a bow base and bow extension mechanism to operate a tarping system to cover an open-topped hauling vehicle.

The present invention can also be adapted for use as a knuckle joint 110 in a bow base and bow extension type actuation system, as shown in FIG. 10. In embodiments for this application, the pivot shaft 67 (see FIG. 5) can be attached to either the bow base 130 or the bow extension 150. The housing 125 can be attached to the other of the two members.

Figure 11:
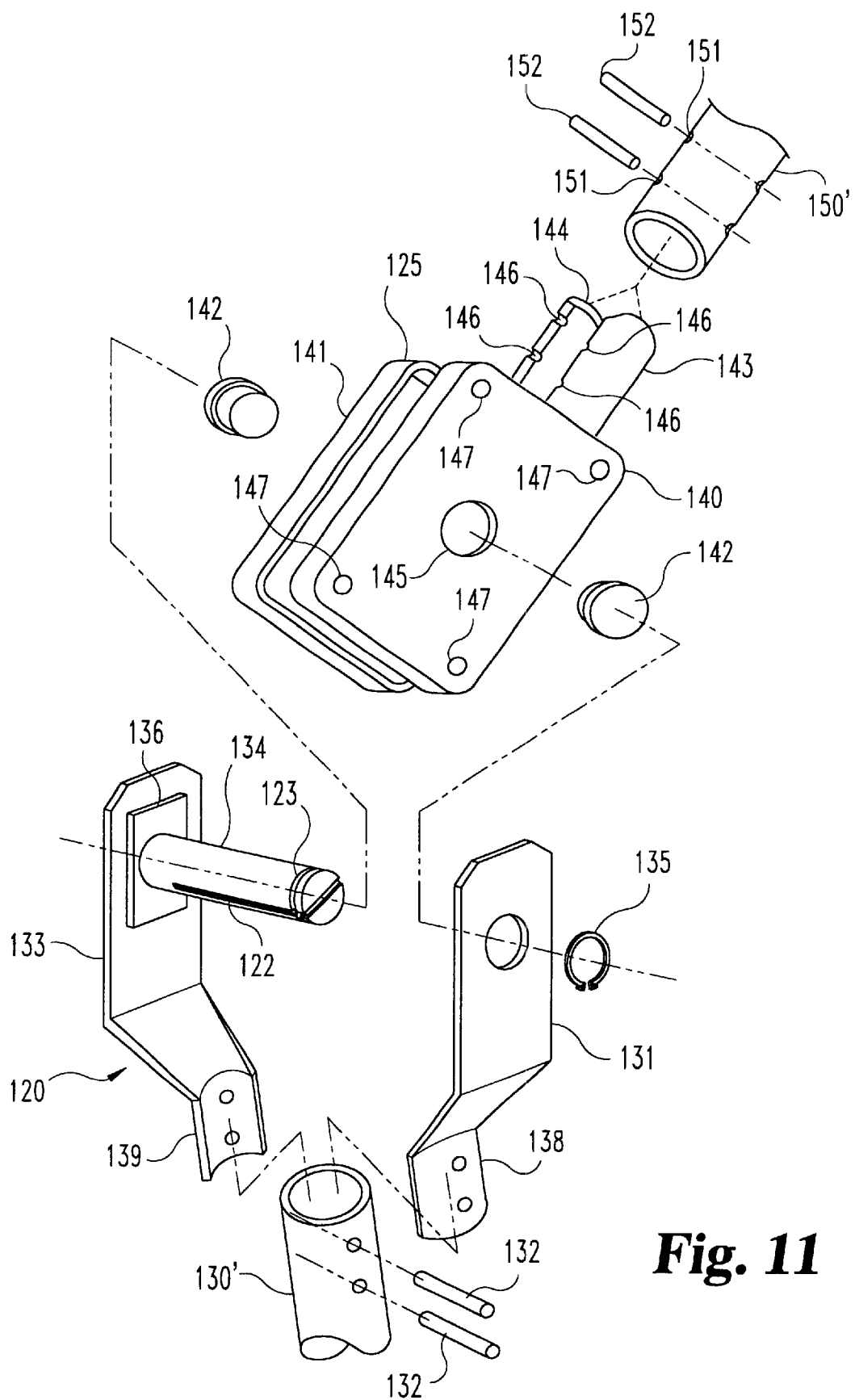
FIG. 11 is an exploded view of one embodiment of the invention used as the knuckle joint in a bow base and bow extension application.

One specific example of such an application is shown in FIG. 11. In this example, a two piece yoke assembly 120 is used to attach the pivot shaft 134 to the bow base 130'. The yoke legs 138 and 139 form a cylindrical section when the yoke is assembled, and preferably include holes that mate with holes in the bow base 130'. Bow base 130' is preferably hollow at the free end to receive the combined yoke legs therein. Pins 132 or bolts can be used to complete the attachment of the yoke assembly 120 to the bow base 130'.

The pivot shaft 134 can project from a mounting plate 136 that is attached, preferably by welding, to yoke arm 133. Housing 125 is made up of two housing halves 140 and 141 and includes shaft bushings 142. The housing halves 140 and 141 are held together by bolts through bolt bores 147. Housing 125 is positioned between yoke arms 131 and 133 with the pivot shaft 134 passing through bushings 142 and the pivot shaft bore 145. The pivot shaft slot 122 engages the center portion of at least one double coil spring (not shown)

within the housing 125. A retaining ring 135 is attached to the end of the pivot shaft 134 in retaining ring groove 123 to hold the assembly together.

The housing is attached to the bow extension member 150' preferably by inserting the housing attachment portions 143 and 144 into the end of the bow extension 150'. Retaining pins 152 or bolts through attachment holes 151 in the bow extension and corresponding holes 146 in the housing attachment portions secure these components together. Alternatively, the housing can be attached to the bow base 130' and the yoke assembly 120 can be attached to the bow extension member 150' without altering either the base 130' or member 150' from the configuration shown in FIG. 11.

While the invention has been illustrated and described in detail in the drawings and foregoing description, the same is to be considered as illustrative and not restrictive in character. It should be understood that only the preferred embodiments have been shown and described and that all changes and modifications that come within the spirit of the invention are desired to be protected.

What is claimed is:

1. An actuation mechanism for a cover system on an open-topped container, the cover system including a cover extendable from a stowed position to a deployed position covering the container and a bail member attached to the cover and movable relative to the container to move the cover between the stowed and deployed positions, said mechanism comprising:
    at least one double-coil spring having two coil portions concentrically wound around each other and disposed in a common plane with an integral center portion between each said coil portion, each of said coil portions including a free reaction end;
    a pivot shaft mountable on the container, and having a portion configured for attachment to said center portion of said spring;
    a housing connectable to the bail member and defining a bore to receive said pivot shaft therethrough, said housing configured to receive said at least one spring therein with said center portion attached to said pivot shaft;
    a pair of reaction posts disposed within said housing, each of said posts configured to contact said reaction end of a corresponding one of said two coil portions, whereby said at least one double-coil spring applies a torsional force to the bail member through said pair of reaction posts and said housing; and
    wherein said housing includes a male half and a female half connectable to said male half; and
    wherein each of said reaction posts includes a first portion and a second portion and each of said first portions is attached to one of said housing halves and each of said second portions is attached to the other of said housing halves.

2. The actuation mechanism of claim 1 wherein said housing further includes:
    an arm attachment portion for attachment of said housing to the bail member;
    means for connecting said male and female housing halves; and
    means for engaging said housing to the bail member.

3. The actuation mechanism of claim 1 wherein:
    said housing halves have a sidewall and said reaction post portions are integral with said housing halves and include a web between said post portions and said sidewalls for strengthening said post portions.

4. The actuation mechanism of claim 2 wherein the bail member includes a pair of holes and is configured to receive said arm attachment portion therein and said arm attachment portion includes a pair of holes configured for alignment with the holes of the bail member when inserted therein, said engagement means including a pair of bolts through said holes.

5. The actuation mechanism of claim 2 wherein said housing halves define a plurality of retaining bolt bores and said connecting means includes retaining bolts disposed therethrough.

6. The actuation mechanism of claim 2 wherein each said housing half defines a flange having a plurality of bolt holes and said connecting means includes retaining bolts disposed within corresponding bolt holes of said flanges.

7. An actuation mechanism for a cover system on an open-topped container, the cover system including a cover extendable from a stowed position to a deployed position covering the container, a bow extension attached to the cover and movable relative to the container, and a bow base pivotably attached to the container, and said mechanism connecting the bow base to the bow extension, said mechanism comprising:
    at least one double-coil spring having two coil portions concentrically wound around each other and disposed in a common plane with an integral center portion between each said coil portion, each of said coil portions including a free reaction end;
    a pivot shaft mountable on one of the bow base and the bow extension, and having a portion configured for attachment to said center portion of said spring;
    a housing connectable to the other of the bow base and the bow extension and defining a bore to receive said pivot shaft therethrough, said housing configured to receive said at least one spring therein with said center portion attached to said pivot shaft; and
    a pair of reaction posts disposed within said housing, each of said posts configured to contact said reaction end of a corresponding one of said two coil portions, whereby said at least one double-coil spring applies a torsional force to the bail member through said pair of reaction posts and said housing.

8. The actuation mechanism of claim 7 wherein said center portion of said spring includes a linear elongated section connecting said two coil portions.

9. The actuation mechanism of claim 8 wherein said linear elongated section is at least about 1.25 inches in length.

10. The actuation mechanism of claim 7 wherein said pivot shaft defines an elongated slot for receiving said center portion of said spring.

11. The actuation mechanism of claim 7 wherein said pivot shaft is attachable to a mounting plate configured to be mounted on one of the bow base and the bow extension.

12. The actuation mechanism of claim 7 wherein said pivot shaft has a free end defining a retaining ring groove and includes a retaining ring disposed within said groove for holding said housing on said pivot shaft when said pivot shaft extends through said housing bore.

13. The actuation mechanism of claim 7 wherein said mechanism further includes a yoke assembly, said yoke assembly including a first half and a second half, connectable to said first half, each said half defining an arm portion and a leg portion, wherein said leg portions are configured for attachment to one of the bow base and the bow extension when said halves are connected together, and wherein said housing is receivable between said arm portions.

14. The actuation mechanism of claim 13 wherein said pivot shaft is attached to a mounting plate and said mounting plate is attached to one of said yoke arm portions, and wherein the other of said arm portions defines a bore for said pivot shaft to pass therethrough, whereby said housing is retained between said yoke arm portions.

15. An actuation mechanism for a cover system on an open-topped container, the cover system including a cover extendable from a stowed position to a deployed position covering the container, a bow extension attached to the cover and movable relative to the container, and a bow base pivotably attached to the container, and said mechanism connecting the bow base to the bow extension, said mechanism comprising:

at least one double-coil spring having two coil portions concentrically wound around each other and disposed in a common plane with an integral center portion between each said coil portion, each of said coil portions including a free reaction end;

a pivot shaft mountable on one of the bow base and the bow extension, and having a portion configured for attachment to said center portion of said spring;

a housing connectable to the other of the bow base and the bow extension and defining a bore to receive said pivot shaft therethrough, said housing configured to receive said at least one spring therein with said center portion attached to said pivot shaft; and a pair of reaction posts disposed within said housing, each of said posts configured to contact said reaction end of a corresponding one of said two coil portions, whereby said at least one double-coil spring applies a torsional force to the bail member through said pair of reaction posts and said housing;

wherein said housing includes:

a male half and a female half, connectable to said male half, each of said halves including an arm attachment portion for attachment of said housing to the other of the bow base and the bow extension;

means for connecting said male and female housing halves; and means for engaging said housing to the other of the bow base and the bow extension.

16. The actuation mechanism of claim 15 wherein said bore is defined through each of said male and female halves and includes a bushing therein to reduce friction between said male and female halves and said pivot shaft.

17. The actuation mechanism of claim 15 wherein:

each of said reaction posts includes a first portion and a second portion wherein each of said first portions is attached to one of said housing halves and each of said second portions is attached to the other of said housing halves.

18. The actuation mechanism of claim 17 wherein:

said housing halves have a sidewall and said reaction post portions are integral with said housing halves and include a web between said post portions and said sidewalls for strengthening said post portions.

19. The actuation mechanism of claim 15 wherein said engagement means includes a pair of pegs connected to opposite sides of the other of the bow base and bow extension and said arm attachment portion of each of said housing halves includes a pair of peg holes configured to receive said pegs therein.

20. The actuation mechanism of claim 15 wherein the other of the bow base and the bow extension includes a pair of holes and is configured to receive said arm attachment portion therein and said arm attachment portion includes a pair of holes configured for alignment with the holes of the other of the bow base and the bow extension when inserted therein, said engagement means including a pair of bolts through said holes.

* * * * *